US011361239B2

(12) United States Patent
R et al.

(10) Patent No.: US 11,361,239 B2
(45) Date of Patent: Jun. 14, 2022

(54) DIGITAL CONTENT CLASSIFICATION AND RECOMMENDATION BASED UPON ARTIFICIAL INTELLIGENCE REINFORCEMENT LEARNING

(71) Applicant: FMR LLC, Boston, MA (US)

(72) Inventors: Pramod R, Bangalore (IN); Anshuman Pradhan, Bangalore (IN); Shishir Shekhar, Bangalore (IN); Serdar Kadioglu, Somerville, MA (US); Alex Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 448 days.

(21) Appl. No.: 16/677,497

(22) Filed: Nov. 7, 2019

(65) Prior Publication Data

US 2021/0142196 A1    May 13, 2021

(51) Int. Cl.
*G06Q 30/02* (2012.01)
*G06N 20/00* (2019.01)
(Continued)

(52) U.S. Cl.
CPC ........... *G06N 7/005* (2013.01); *G06F 16/248* (2019.01); *G06F 16/252* (2019.01);
(Continued)

(58) Field of Classification Search
CPC .......... G06N 7/005; G06N 20/00; G06N 5/04; G06F 16/258; G06F 16/9535;
(Continued)

(56) References Cited

U.S. PATENT DOCUMENTS 10,878,451 B2 * 12/2020 Cao .................... G06Q 30/0254
2012/0016642 A1 * 1/2012 Li ......................... G06Q 30/02
703/2

(Continued)

OTHER PUBLICATIONS

Narang Yogesh, Recommender systems using LinUCB: A contextual multi-armed bandit approach, Published Apr. 18, 2020, Towards Data Science, pp. 1-8 (pdf).*

(Continued)

*Primary Examiner* — Manglesh M Patel
(74) *Attorney, Agent, or Firm* — Proskauer Rose LLP

(57) ABSTRACT

Methods and apparatuses are described for digital content classification and recommendation based upon reinforcement learning. A server converts unstructured text corresponding to each digital content item into a content item feature set. The server generates a user context vector associated with a plurality of users. The server trains a linear multi-armed bandit (MAB) classification model based upon the user context vectors and historical user content recommendation information. The server receives a new user context vector associated with a new user. The server executes the MAB model using the new user context vector as input to generate content interaction prediction scores. The server selects the content interaction prediction scores above a predetermined threshold and identifies the associated digital content item. The server presents the identified digital content items on a client device and receives a response. The server updates linear UCB coefficient vectors of the MAB model based upon the response.

18 Claims, 7 Drawing Sheets

(51) Int. Cl.
*G06N 7/00* (2006.01)
*G06N 5/04* (2006.01)
*G06F 16/248* (2019.01)
*G06F 16/25* (2019.01)
*G06F 16/9535* (2019.01)

(52) U.S. Cl.
CPC ........ *G06F 16/258* (2019.01); *G06F 16/9535* (2019.01); *G06N 5/04* (2013.01); *G06N 20/00* (2019.01); *G06Q 30/0201* (2013.01)

(58) Field of Classification Search
CPC . G06F 16/248; G06F 16/252; G06Q 30/0201; G06Q 30/0255; G06Q 30/0269
USPC ............................................. 715/200; 706/12
See application file for complete search history.

(56) References Cited

U.S. PATENT DOCUMENTS

2015/0051973 A1   2/2015   Li et al.
2017/0103413 A1   4/2017   He et al.
2019/0394511 A1*  12/2019  Kalaboukis ...... H04N 21/25891

OTHER PUBLICATIONS

Wang, Huazheng et al., "Factorization Bandits for Interactive Recommendation," Association for the Advancement of Artificial Intelligence (www.aaai.org), 2017—8 pages.

* cited by examiner

Response Matrix

|  | Content1 | Content2 | Content3 |
|---|---|---|---|
| event1 | | | |
| event2 | | | |
| event3 | | | |
| event4 | | | |

FIG. 3A

Digital Content Text

| Content id | Content Text |
|---|---|
| Content 1 | .... |
| Content 2 | .... |

FIG. 3B

Customer Feature Matrix

| | User Profile Data (302) | Clickstream Data (304) | Historical Content Consumption Data (306) |
|---|---|---|---|
| event1 | | | |
| event2 | | | |
| event3 | | | |
| event4 | | | |

FIG. 3C

DIGITAL CONTENT CLASSIFICATION AND RECOMMENDATION BASED UPON ARTIFICIAL INTELLIGENCE REINFORCEMENT LEARNING

TECHNICAL FIELD

This application relates generally to methods and apparatuses, including computer program products, for digital content classification and recommendation based upon artificial intelligence reinforcement learning.

BACKGROUND

As computing devices such as smartphones, smart televisions, and tablets have become the preferred way for many consumers to interact with digital content items like web pages, content providers and other entities have become interested in generating content recommendations that are tailored to each particular user's interests and preferences, as well as to predict content items that will be of interest to the user and/or solicit an interaction (e.g., a click) from the user. A traditional way of generating such recommendations are through the use of recommender systems, that analyze user behavior to identify similarities between users and/or content in order to select content that is likely to be of interest to certain users.

However, existing recommender systems typically lack mechanisms that leverage historical user content consumption data and user profile information, in the context of an artificial intelligence reinforcement learning based paradigm, to generate content recommendations that are determined to have an increased likelihood of interaction from a user. Owing to this, they lack the power of discovering or 'exploring' a user's preferences to previously unseen digital content items. Also, traditional recommender systems lack the ability to continuously learn from the newly observed data and auto-correct themselves over a period time, owing to the shift in data over time. These system also typically do not possess the capability of recommending new digital content items to the right set of users, since the systems lack knowledge of the potential audience who may be interested in the new digital content item (also known as the 'cold start' problem in recommender systems).

SUMMARY

Therefore, what is needed are methods and systems that utilize advanced artificial intelligence reinforcement learning techniques through the use of a contextual, linear multi-arm bandit (MAB) classification model to identify digital content items that have a predicted likelihood of interaction with one or more users and present these digital content items to the users, then receive feedback on the digital content items to enhance the accuracy of the MAB classification model. In addition, the techniques described herein provide the advantage of discovering a user's preferences to previously unseen digital content items, for example, by randomly recommending one or more of the digital content items, and discovering the user's preference by monitoring his or her responses to the digital content items. The methods and systems deliver personalized digital content items (such as viewpoint articles, content cards and onsite messages) based on the type of content, the user's historical activity and web behavioral attributes, and content engagement history. The techniques described herein also provide the ability for the model to auto-correct based on feedback (for example, a click) received from the user for the given recommendation, which is known as online learning in the area of machine learning. The techniques also help in solving the cold start problem, which relates to recommending a new digital content item or items to the set of potential users who would be most interested in viewing them.

The techniques described herein can be advantageously applied to:
  Personalize recommendation of digital content to specific users, based on the user's topics of interest at that point in time, the user's preference with respect to similar digital content items shown in the past, and the user's indication of feedback to digital content items;
  Increase content engagement of the users;
  Improve click rates based on the recommendation of digital content items on various pages of a website;
  Self-learn and adapt the prediction model based on the learned experiences of the user's responses over time.

The invention, in one aspect, features a system for digital content classification and recommendation to users based upon artificial intelligence reinforcement learning. The system comprises a computer data store including (i) a plurality of digital content items, (ii) user profile information for each of a plurality of users, (iii) historical user click information for each the plurality of users; (iv) historical user content consumption information for each of the plurality of users, and (v) historical user content recommendation information for each of the plurality of users. The system comprises a server computing device in communication with the computer data store. The server computing device converts unstructured text corresponding to each digital content item into a multidimensional content item feature set. The server computing device generates a multidimensional user context vector associated with each user of the plurality of users based upon the user profile information of the user, the historical user click information of the user, the historical user content consumption information of the user. The server computing device trains a linear multi-armed bandit (MAB) classification model based upon the multidimensional user context vectors associated with the plurality of users and the historical user content recommendation information for the plurality of users, the MAB classification model comprising a plurality of arms, each arm associated with a digital content item and each arm having a linear upper confidence bound (UCB) coefficient vector that is generated during training. The server computing device receives a new multidimensional user context vector associated with a new user. The server computing device executes the linear MAB classification model using the new multidimensional user context vector as input to generate a plurality of content interaction prediction scores for the new user, each content interaction prediction score generated from one of the arms of the linear MAB classification model. The server computing device selects one or more of the plurality of content interaction prediction scores above a predetermined threshold and identifies the digital content item associated with each selected content interaction prediction score. The server computing device presents one or more of the identified digital content items on a client computing device associated with the new user and receives a response to the presented digital content items from the client computing device. The server computing device updates one or more of the linear UCB coefficient vectors of the linear MAB classification model based upon the response to the presented digital content items.

The invention, in another aspect, features a computerized method of digital content classification and recommendation to users based upon artificial intelligence reinforcement learning. A computer data store includes (i) a plurality of digital content items, (ii) user profile information for each of a plurality of users, (iii) historical user click information for each the plurality of users; (iv) historical user content consumption information for each of the plurality of users, and (v) historical user content recommendation information for each of the plurality of users. A server computing device in communication with the computer data store converts unstructured text corresponding to each digital content item into a multidimensional content item feature set. The server computing device generates a multidimensional user context vector associated with each user of the plurality of users based upon the user profile information of the user, the historical user click information of the user, the historical user content consumption information of the user. The server computing device trains a linear multi-armed bandit (MAB) classification model based upon the multidimensional user context vectors associated with the plurality of users and the historical user content recommendation information for the plurality of users, the MAB classification model comprising a plurality of arms, each arm associated with a digital content item and each arm having a linear upper confidence bound (UCB) coefficient vector that is generated during training. The server computing device receives a new multidimensional user context vector associated with a new user. The server computing device executes the linear MAB classification model using the new multidimensional user context vector as input to generate a plurality of content interaction prediction scores for the new user, each content interaction prediction score generated from one of the arms of the linear MAB classification model. The server computing device selects one or more of the plurality of content interaction prediction scores above a predetermined threshold and identifies the digital content item associated with each selected content interaction prediction score. The server computing device presents one or more of the identified digital content items on a client computing device associated with the new user and receives a response to the presented digital content items from the client computing device. The server computing device updates one or more of the linear UCB coefficient vectors of the linear MAB classification model based upon the response to the presented digital content items.

Any of the above aspects can include one or more of the following features. In some embodiments, the server computing device is further programmed to: receive a new digital content item; convert unstructured text corresponding to the new digital content item into a new multidimensional content item feature set; determine a similar digital content item from the plurality of digital content items based upon a comparison of one or more characteristics of the new digital content item and the plurality of digital content items; and update the linear MAB classification model to include a new arm corresponding to the new digital content item, the new arm having the UCB coefficient vector from the arm associated with the similar digital content item. In some embodiments, the server computing device is further programmed to: execute the updated linear MAB classification model using the new multidimensional user context vector as input to generate a plurality of content interaction prediction scores for the new user, each content interaction prediction score generated from one of the arms of the linear MAB classification model; select one or more of the plurality of content interaction prediction scores above a predetermined threshold and identify the digital content item associated with each selected content interaction prediction score; present one or more of the identified digital content items on a client computing device associated with the new user and receive a response to the presented digital content items from the client computing device; and update one or more of the UCB coefficient vectors of the multi-armed bandit (MAB) classification model based upon the response to the presented digital content items.

In some embodiments, converting unstructured text corresponding to each digital content item into a multidimensional content item feature set comprises: formatting the unstructured text corresponding to each digital content item; generating an initial content item feature set based upon the formatted text using a Term Frequency-Inverse Document Frequency (TF-IDF) algorithm; and converting the initial content item feature set into the multidimensional content item feature set using a non-negative matrix factorization (NMF) algorithm. In some embodiments, the NMF algorithm reduces a number of dimensions of the initial content item feature set.

In some embodiments, the plurality of digital content items comprise one or more of text articles, content cards, or website messages. In some embodiments, the historical user content consumption information comprises (i) a historical customer profile including demographics of the user, financial activities of the user, and prior interactions of the user; (ii) one or more sequences of web addresses accessed by the user during a browsing session and an identifier associated with a digital content item presented on each web address in the one or more sequences of web addresses; and (iii) historical user content item consumption history information including one or more sequences of text contained in the webpages accessed by the user during a web browsing session. In some embodiments, generating a multidimensional content consumption vector comprises transforming the historical customer profile, the one or more sequences of web addresses, and the historical user content item consumption history information into features of the multidimensional content consumption vector using, e.g., the TF-IDF and non-negative matrix factorization techniques. In some embodiments, the response to the presented digital content items comprises a click on one of the presented digital content items.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 3A to 3C are diagrams of input data structures for use in digital content classification and recommendation based upon artificial intelligence reinforcement learning.

DETAILED DESCRIPTION

Figure 1:
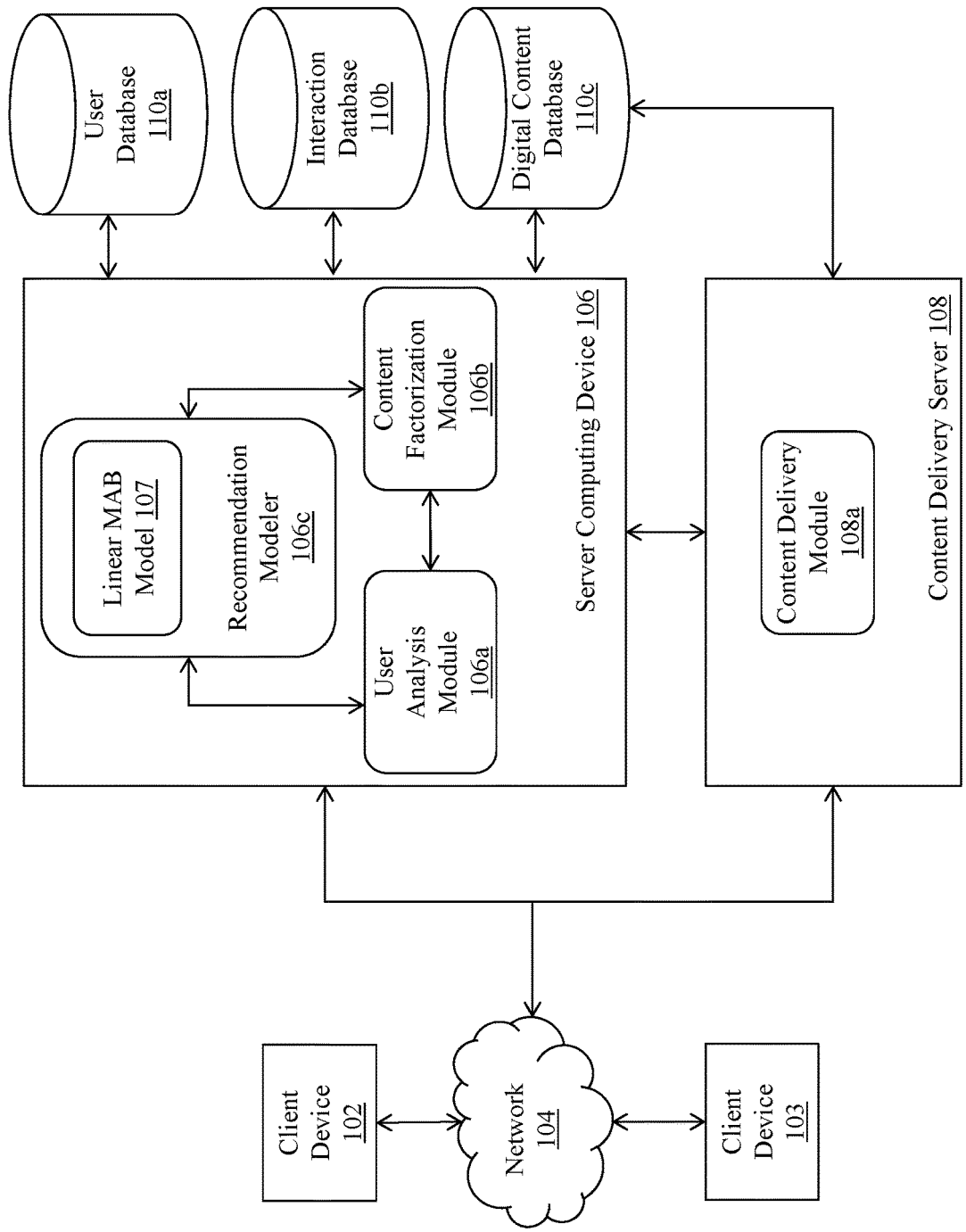
FIG. 1 is a block diagram of a system for digital content classification and recommendation based upon artificial intelligence reinforcement learning.

FIG. 1 is a block diagram of a system 100 for digital content classification and recommendation based upon artificial intelligence reinforcement learning. The system 100 includes a client computing device 102, a client computing device 103, a communication network 104, a server computing device 106 that includes a user analysis module 106a, a content factorization module 106b, a recommendation modeler 106c with a linear multi-arm bandit (MAB) module 107, a content delivery server 108 with a content delivery module 108, and a plurality of databases—a user database 110a, an interaction database 110b and a digital content database 110c.

The client computing devices 102, 103 connect to the communication network 104 in order to communicate with the server computing device 106 and the content delivery server 108 to provide input and receive output relating to the process of digital content classification and recommendation based upon artificial intelligence reinforcement learning as described herein. In some embodiments, the client computing devices 102, 103 are each coupled to an associated display device (not shown). For example, client computing devices 102, 103 can provide a graphical user interface (GUI) via the display device that is configured to receive input from a user of the device 102, 103 and to present output (e.g., digital content items) to the user that results from the methods and systems described herein.

Exemplary client computing devices 102, 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client computing devices 102, 103, it should be appreciated that the system 100 can include any number of client computing devices.

The communication network 104 enables the client computing devices 102, 103 to communicate with the server computing device 106 and the content delivery server 108. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for digital content classification and recommendation based upon artificial intelligence reinforcement learning as described herein. The server computing device 106 includes a user analysis module 106a, a content factorization module 106b, a recommendation modeler 106c with a linear multi-arm bandit (MAB) module 107 that execute on the processor of the server computing device 106. In some embodiments, the modules 106a, 106b, 106c and 107 are specialized sets of computer software instructions programmed onto one or more dedicated processors in the server computing device 106 and can include specifically-designated memory locations and/or registers for executing the specialized computer software instructions.

Although the modules 106a, 106b, 106c and 107 are shown in FIG. 1 as executing within the same server computing device 106, in some embodiments the functionality of the modules 106a, 106b, 106c and 107 can be distributed among a plurality of server computing devices. As shown in FIG. 1, the server computing device 106 enables the modules 106a, 106b, 106c and 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a, 106b, 106c and 107 is described in detail below.

The content delivery server 108 is a computing device (or set of computing devices) to which the client computing devices 102, 103 can connect to retrieve and display digital content items (such as web pages). The content delivery server 108 is a combination of hardware, including one or more special-purpose processors and one or more physical memory modules, and specialized software modules (such as content delivery module 108a) that are executed by a processor of the content delivery server 108. In some embodiments, the content delivery server 108 is an online content platform that provides certain digital content objects (e.g., text content such as articles, web pages, etc.) via a content delivery network. Typically, the website comprises a plurality of visual and non-visual elements that make up the content transmitted and displayed to a user when, e.g., browser software on the client computing device 102, 103 connects to the content delivery server 108 via a communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video).

The databases 110a-110c are located on a computing device (or in some embodiments, on a set of computing devices) coupled to the server computing device 106 and content delivery server 108 and the databases are configured to receive, generate, and store specific segments of data relating to the process of digital content classification and recommendation based upon artificial intelligence reinforcement learning as described herein. In some embodiments, all or a portion of the databases 110a-110c can be integrated with the server computing device 106, the content delivery server 108, or be located on a separate computing device or devices. The databases 110a-110c can comprise one or more databases configured to store portions of data used by the other components of the system 100, as will be described in greater detail below. An exemplary database 110a-110c is MySQL™ available from Oracle Corp. of Redwood City, Calif.

In some embodiments, the user database 110a comprises user profile information for a plurality of users of the system 100; typically, each user is associated with one or more client computing devices 102, 103. An exemplary data structure for use in the user database 110a is shown in FIG. 3C. The user profile information can include, but is not limited to, user financial information/user demographic information (302) when a digital content item was presented to the user, historical user interaction data (304) relating to digital content items presented to the user (e.g., clickstream URL data, ratings, feedback, etc.), and historical user digital content item consumption information (306) (e.g., which digital content items has the user viewed/interacted with in the past). Each of the above categories of information are associated with an event (left-hand column, e.g., event1, event2, event3, event4), where an event is defined as the presentation or suggestion of a particular digital content item to a user.

In some embodiments, the interaction database 110b comprises a historical list of events relating to a user's interaction with one or more digital content items. An exemplary data structure for use in the interaction database 110b is shown in FIG. 3A as a response matrix where each cell comprises an indication of how the user responded to a particular digital content item (e.g., Content1, Content2, Content3) when the content item was presented to the user (e.g., event1, event2, event3, event4). As an example, for each event and corresponding digital content item, the interaction database 110b can store data such as a identifier for the digital content item, an identifier of the user and/or client computing device 102, 103 on which the digital content item was presented, a timestamp of when the digital content item was presented, and a response from the user and/or client computing device 102, 103 with respect to the digital content item (e.g., click, view time, scroll time, etc.)

In some embodiments, the digital content database 110c comprises unstructured computer text corresponding to the content of each digital content item. An exemplary data structure for use in the digital content database 110c is shown in FIG. 3B. For each digital content item (e.g., Content1, Content2, Content3), the data structure contains the unstructured text that makes up the digital content item. Further detail on the unstructured computer text is provided below.

Figure 2:
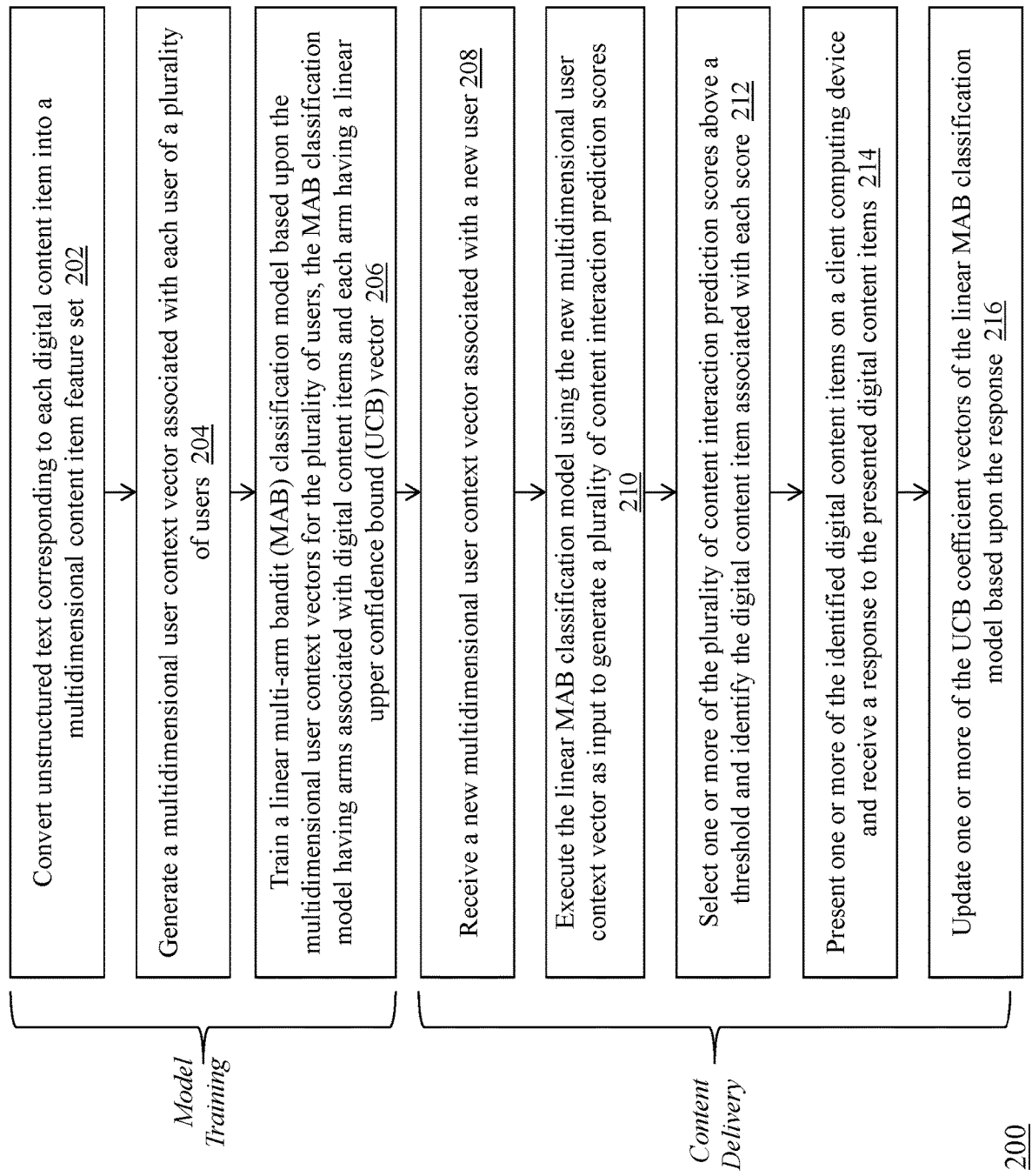
FIG. 2 is a flow diagram of a computerized method of digital content classification and recommendation based upon artificial intelligence reinforcement learning.

FIG. 2 is a computerized method 200 of digital content classification and recommendation based upon artificial intelligence reinforcement learning, using the system 100 of FIG. 1. As shown in FIG. 2, the steps 202, 204, 206 can be considered as a training phase, where the artificial intelligence classification and recommendation model described herein is trained using historical user and digital item content information. As part of this training phase, to prepare the digital content items for analysis and recommendation, the content factorization module 106b converts (202) the unstructured text corresponding to each digital content item into a multidimensional content item feature set.

Figure 4:
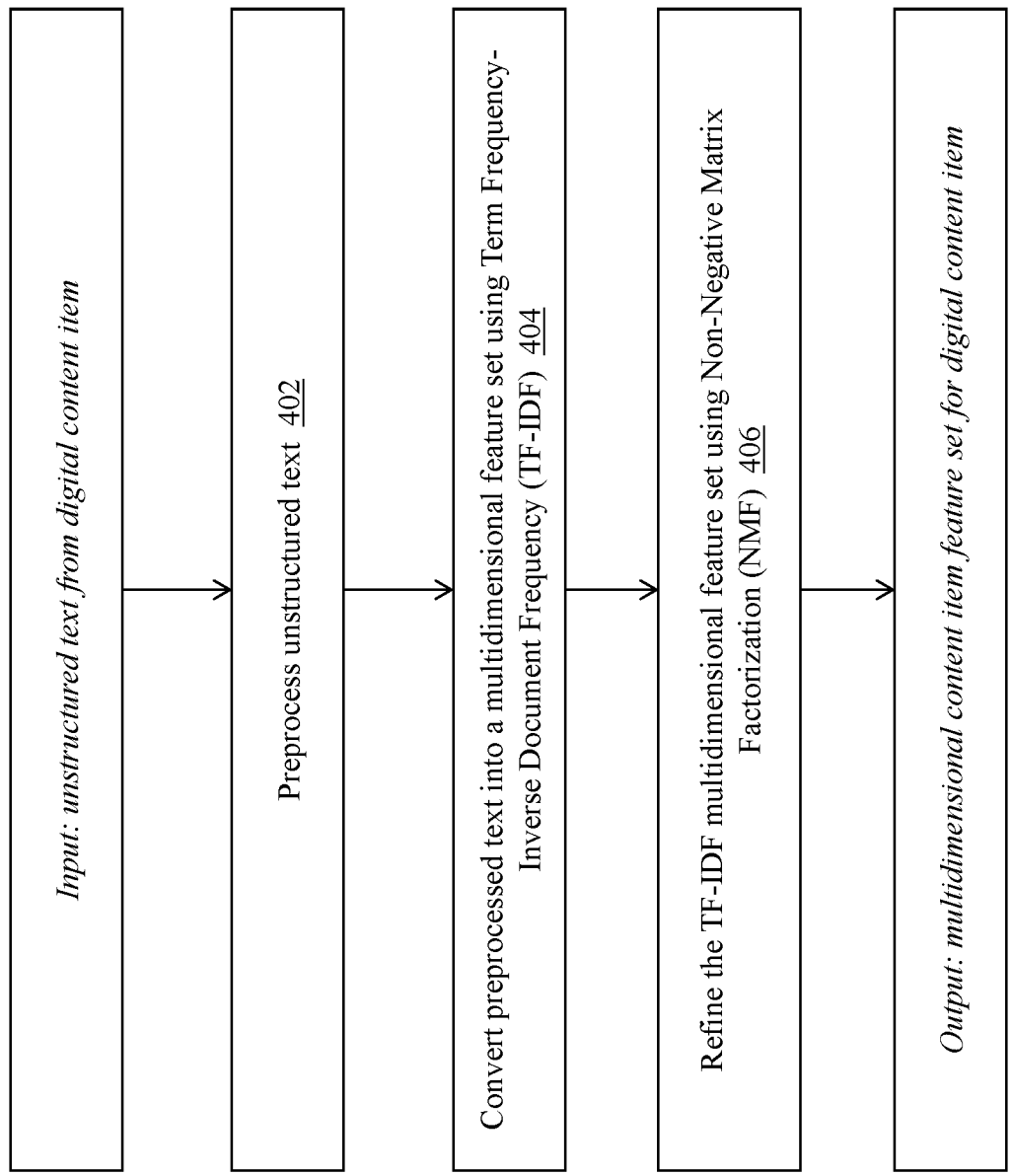
FIG. 4 is a flow diagram of a computerized method of converting unstructured text corresponding to a digital content item into a multidimensional content item feature set.

FIG. 4 is a flow diagram of a computerized method of converting unstructured text corresponding to a digital content item into a multidimensional content item feature set, using the system 100 of FIG. 1. The content factorization module 106b receives as input the unstructured computer text for each digital content item from digital content database 110c. For each digital content item, the content factorization module 106b preprocesses (402) the unstructured text. In some embodiments, the content factorization module 106b performs functions such as converting all of the unstructured text to lowercase; removing commonly-occurring words and/or non-informative words (e.g., by filtering the text using a defined list of stopwords, including words learned by the system over time); and lemmatizing at least a portion of the remaining words. In some embodiments, the content factorization module 106b can store the preprocessed corpus of text in a database.

Next, the content factorization module 106b converts the preprocessed text into a multidimensional feature set using Term Frequency-Inverse Document Frequency (TF-IDF) techniques. TF-IDF is a popular method for determining the significance and/or relevance of each term in a particular corpus of text, weighted by the term's occurrence in the entire corpus of text. The content factorization module 106b can generate a multidimensional feature set that corresponds to the TF-IDF for the unstructured text. Additional information about the application of TF-IDF is available from en.wikipedia.org/wiki/Tf-idf. In some embodiments, the module 106b uses sklearn.feature_extraction.text.T-FIDFVectorizer (http://scikit-learn.org/stable/modules/generated/sklearn.feature_extraction.text.TfidfVectorizer.html) module to extract the TF-IDF features. For example, if the input text below is fed in to the module 106b as an input, the module 106b would return a vector representation as shown below:

Input: "When you open a retail brokerage or retirement account, your cash automatically goes into our money market fund."

Output: [0, 0, 0, 0, 0.4789, 0, 0, 0, 0, 1.46278 . . . .]

The output is generally an n-dimensional vector, where n would be the number of words in the vocabulary (all the words that were ever used in all the content items put together).

The application of a TF-IDF algorithm to the unstructured text typically results in a multidimensional feature set having a lot of features, many of which may be redundant or irrelevant for the purposes of content recommendation. Therefore, the content factorization module 106b refines (406) the TF-IDF multidimensional feature set using non-negative matrix factorization (NMF) algorithms—which can further reduce the number of dimensions of the feature set to be used for the classification model. Additional information about the application of NMF is available from https://en.wikipedia.org/wiki/Non-negative_matrix_factorization. In some embodiments, the module 106b uses sklearn.decomposition.NMF (http://scikit-learn.org/stable/modules/generated/sklearn.decomposition.NMF.html) module to extract the NMF Features. For example, NMF takes in TF-IDF vectors from the previous step as an input and outputs a condensed vector as shown below:

Input: [0, 0, 0, 0, 0.4789, 0, 0, 0, 0, 1.46278 . . . .]
Output: [10.372, 0.7252, 4.362, 1.26, 2.364]

The input dimensions are n (number of words in the vocabulary) and the output dimensions are, in this example, thirty.

After application of the NMF algorithms, the content factorization module 106b generates a multidimensional content item feature set corresponding to each digital content item.

Figure 5:
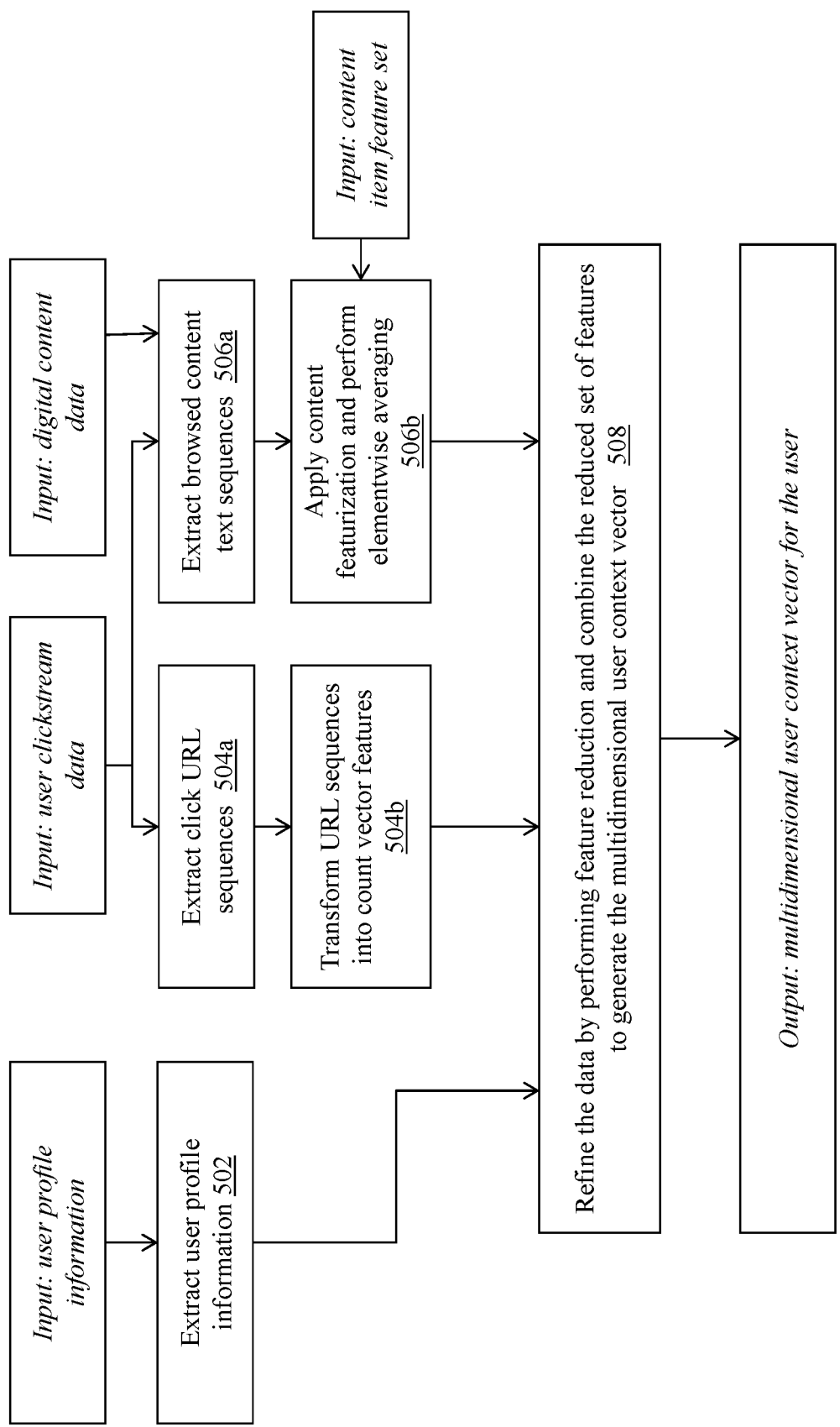
FIG. 5 is a flow diagram of a computerized method of converting historical user profile information and historical digital content item consumption data into a multidimensional user context vector for the user.

Turning back to FIG. 2, the user analysis module 106a generates (204) a multidimensional user context vector associated with each user of a plurality of users (e.g., users that have previously used the content recommendation system to be presented with digital content items on their client devices and provided feedback on those items). FIG. 5 is a flow diagram of a computerized method of converting historical user profile information and historical digital content item consumption data into a multidimensional user context vector for the user, using the system 100 of FIG. 1. The user analysis module 106a extracts (502) user profile information for each user from user database 110a and/or interaction database 110b. As mentioned above, the user profile information for each user can include financial information/demographic information of the user, historical user interaction data relating to digital content items presented to the user, and historical user digital content item consumption information. In some embodiments, the user analysis module 106a can perform transformations on the user profile information (e.g., sum, average, log transformation, standard deviation) across various time periods—in order to determine the significance of certain data points (and corresponding transformations) in the overall content recommendation process. In a first example, for varying time periods, the module 106a can extract, e.g., the number of times a customer has contacted a call center in the last one-, three-, or six months—these amounts to three different features for the user profile information. In a second example, for varying transformations, the module 106a can determine average and standard deviation of the withdrawal amount for a fund in the last six months—these amounts to two different features for the user profile information.

The user analysis module 106a also extracts (504a) click URL sequences associated with the user. For example, the user analysis module 106a can determine one or more sequences of URLs browsed by the user during the prior N sessions by querying the interaction database 110b. The user analysis module 106a transforms (504b) each URL sequence into a count vector by counting a number of times that each URL is accessed during a particular user session. An example count vector is as follows:

Input: sequence of URLs, [url5, url1, url2, url8, url3, . . . ]

Output: [1, 1, 0, 0, 2, . . . ]

Here, the output represents the number of times a corresponding URL has been clicked.

Typically, each URL in the sequence of URLs can be associated with a digital content item. The user analysis module 106a uses the URL sequences to extract (506a) the text corresponding to each of the browsed URLs (i.e., the processed corpus of text as described above with respect to FIG. 3A to 3C) from, e.g., the digital content database 110c. If necessary, the user analysis module 106a performs (506b) the text featurization process described above with respect to FIG. 4 on the corpus of text for each URL to generate a multidimensional content item feature set for the digital content item (or in some embodiments, retrieves the multidimensional content item feature set for the content item, that was previously generated by the content factorization module 106b). Using the sequence of URLs, the user analysis module 106a converts the sequence of URLs (e.g., using a URL ID or other identifier) into a sequence of multidimensional content item feature sets. The user analysis module 106a also performs elementwise averaging to obtain the text consumption history features. As an example, say a user Example: Say a user has visited 3 pages—page1, page2 and page3, whose NMF feature sequences look like this:

Page1: [4.21, 9.272, 0.271 . . . ]$^{30}$
Page2: [8.26, 0.726, 1.223 . . . ]$^{30}$
Page3: [2.235, 8.162, 0.016 . . . ]$^{30}$
Output: [5.475, 6.352, 0.876 . . . ]$^{30}$ Here, the output is a thirty-dimensional vector obtained by elementwise average of the page vectors.

The user analysis module 106a then refines (508) the above multidimensional feature data by removing redundant or irrelevant features and combines the reduced set of feature to generate the multidimensional user context vector.

Turning back to FIG. 2, once the system has generated the multidimensional user context vectors for the plurality of users, the recommendation modeler 106c trains (206) the linear multi-arm bandit (MAB) classification model 107 based upon the multidimensional user context vectors associated with the plurality of users and the historical user content recommendation information for the plurality of users (e.g., as stored in the interaction database 110b). The MAB classification model 107 is a reinforcement-learning based artificial intelligence model that comprises a plurality of arms, each arm corresponding to a probability or confidence score that a particular user will interact with a particular digital content item. Each arm of the MAB model 107 is associated with a digital content item, and each arm comprises a set of regression coefficients that are used by the system 100 to calculate a content interaction prediction score for the digital content item for a particular user (e.g., by using the multidimensional user context vector as input). The recommendation modeler 106c can utilize the MAB model 107 by analyzing each arm to determine a set of one or more digital content items that have a high probability for interaction by a particular user, and the recommendation modeler 106c can leverage exploitation and exploration techniques (e.g., Thomson sampling) on the plurality of arms of the MAB model 107 to garner feedback from users on specific digital content items and use that feedback to strengthen the MAB model, as described herein. Additional information about multi-arm bandit algorithms is available at https://en.wikipedia.org/wiki/Multi-armed_bandit.

Figure 6:
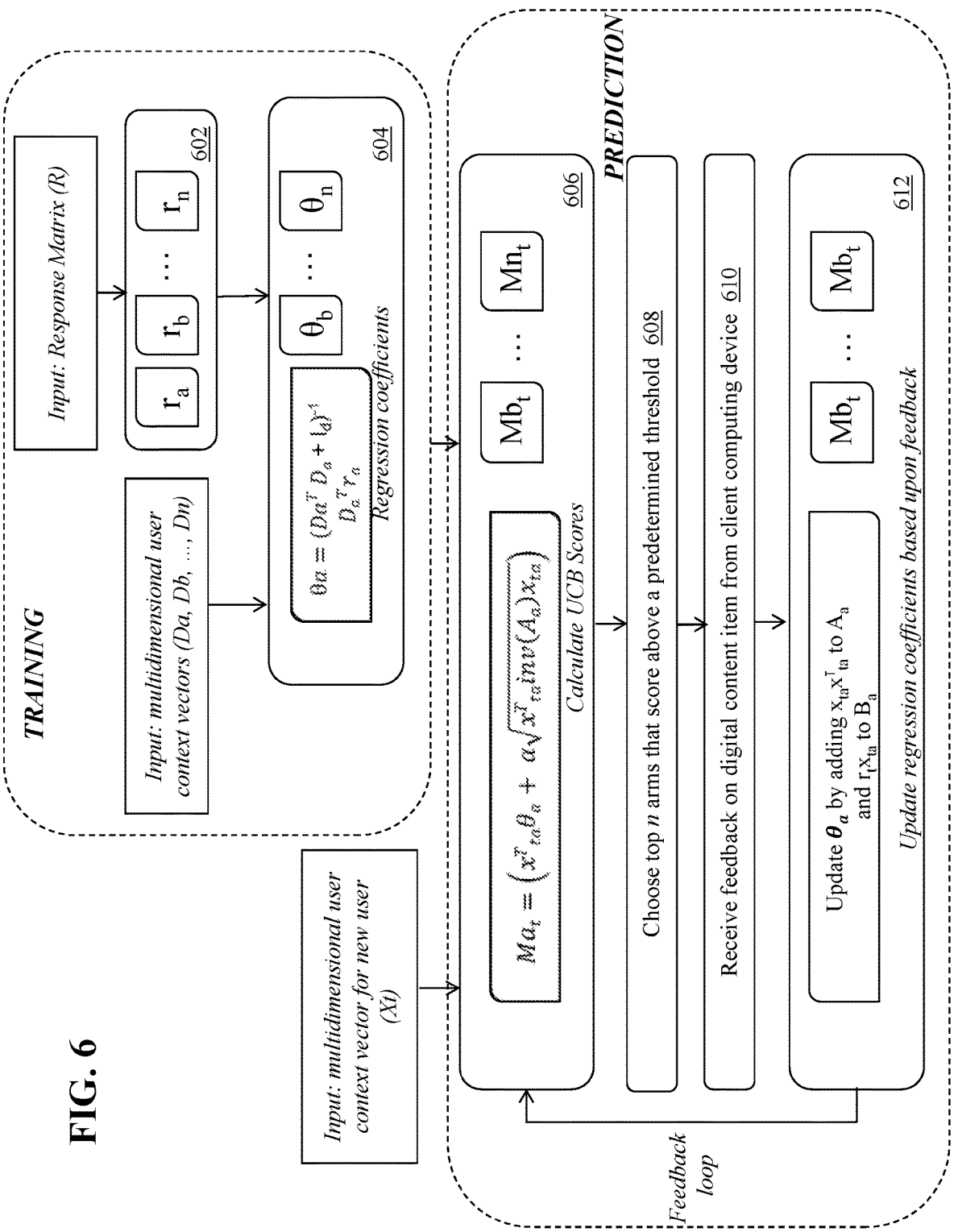
FIG. 6 is a flow diagram of a computerized method of generating digital content item recommendations using a trained linear multi-arm bandit (MAB) classification model with linear upper confidence bound (UCB).

FIG. 6 is a flow diagram of a computerized method of generating digital content item recommendations using a trained linear multi-arm bandit (MAB) classification model with linear upper confidence bound (UCB). As shown in FIG. 6, the flow comprises two parts: the first part (labeled 'TRAINING') comprises training the linear MAB classification model using the multidimensional user context vectors for the plurality of users as explained above and the response matrix (see FIGS. 3A to 3C) as input to generate regression coefficients for each arm of the MAB model. The second part (labeled 'PREDICTION') comprises executing the linear MAB classification model for new users to generate digital content item recommendations and obtain feedback on the recommendations to refine the MAB model.

In step 602, the recommendation modeler 106c generates a response vector (e.g., ra, rb, . . . , rn) for each digital content item (therefore comprising a different arm of the MAB model 107), and the response vector has one column and the same number of rows as the response matrix shown in FIG. 3A. For example, for a particular digital content item (Content 1), the response vector can have a row that contains a value for each event (e.g., 0 for no interaction/response, 1 for an interaction/response).

The recommendation modeler 106c combines the response vectors for each arm (e.g., ra, rb, . . . , rn) with the multidimensional user context vectors for the plurality of users (Da, Db, . . . , Dn) to generate in step 604 the regression coefficients for each arm of the MAB model 107. As shown in FIG. 6, each set of regression coefficients is defined as:

$$\theta_a = (D_a^T D_a + I_d)^{-1} D_a^T r_a$$

The regression coefficients are calculated for each arm using a Ridge regression of Dn and rn.

Once the linear MAB model 107 is trained, the recommendation modeler 106c can be used to process a multidimensional user context vector associated with a new user (which may be a user that has not yet received any content recommendations) to generate one or more digital content item recommendations based upon predicted likelihood that the new user will interact with the recommended digital content items. Turning back to FIG. 2, the system is used in a content delivery phase (i.e., steps 208, 210, 212, 214, 216). The recommendation modeler 106c receives (208) a new multidimensional user context vector associated with a new user, and the modeler 106c executes (210) the linear MAB classification model 107 using the new multidimensional user context vector as input to generate a plurality of content interaction prediction scores. The modeler 106c selects (212) one or more of the plurality of content interaction prediction scores above a predefined threshold (i.e., scores that indicate a positive likelihood that the new user will interact with the corresponding digital content item(s)) and the modeler 106c passes indicia of the digital content items (e.g., a content identifier, a URL, etc.) that have the selected content interaction prediction scores to the content delivery server 108. The content delivery module 108a presents (212) one or more of the identified digital content items on the client computing device 102, 103 of the new user and receives a response (e.g., click or no click, etc.) to the presented digital content item(s). The response is transmitted back to the recommendation modeler 106c, which uses the response to update one or more of the UCB coefficient vectors of the linear MAB classification model 107. Further detail about the content prediction and recommendation process is provided below with respect to FIG. 6.

As noted above, the recommendation modeler 106c receives the multidimensional user context vector (Xt) for the new user as input and in step 606 of FIG. 6, the modeler 106c calculates a MAB upper confidence bound (UCB) score (Mn) for each arm of the MAB model 107. Each UCB score is calculated as follows (e.g., for arm a):

$$M^a{}_t = (x^T_t a \theta^a + \alpha \sqrt{x^T_{ta} \text{inv}(A_a) x_{ta}}$$

At step 608, the recommendation modeler 106c chooses a number of arms (e.g., the top n arms) that are associated with a UCB score above a predetermined threshold, thereby indicating a positive likelihood that the new user will interact with the corresponding digital content item. As noted above, the recommendation modeler 106c transmits the scores (and/or indicia of the digital content items that correspond to the scores) to the content delivery server 108. The content delivery module 108a retrieves the corresponding digital content item(s) from, e.g., the digital content database 110c and displays the digital content item(s) on the client computing device 102, 103 of the new user (e.g., as a web page, as a content card, as an onsite message, etc.) The client computing device 102, 103 captures an interaction of the user with the digital content item(s), such as a view or a click (or in some cases, generates an indicator that no interaction was captured within a predetermined time frame), and sends the captured interaction (or indicator of no interaction) back to the content delivery server 108. The content delivery module 108a sends the user feedback to the recommendation modeler 106c.

At step 610, the recommendation modeler 106c receives the feedback on the digital content item(s) and, at step 612, the recommendation modeler 106c updates the regression coefficients for each arm of the linear MAB model 107 based upon the feedback. The modeler 106c updates the coefficients as follows (e.g., for arm a):

Update $\theta_a$ by adding $x_{ta} x^T_{ta}$ to $A_a$ and adding $r_t x_{ta}$ to $B_a$ The recommendation modeler 106c can then use the updated linear MAB model 107 with the updated regression coefficients to evaluate subsequent user context vectors for content prediction and recommendation.

In addition, the system may periodically receive new digital content items (for which no interactions have yet been recorded) to be integrated into linear MAB model 107. This is called the 'cold start' problem. The system is capable of integrating new digital content items into the linear MAB classification model 107 in a manner that enables the model to leverage its existing knowledge about current digital content items. Through this method, the system generates a new arm for the MAB model 107 (i.e., new regression coefficients for the digital content item) and thus enables the model to generate prediction scores for the new digital content item.

Figure 7:
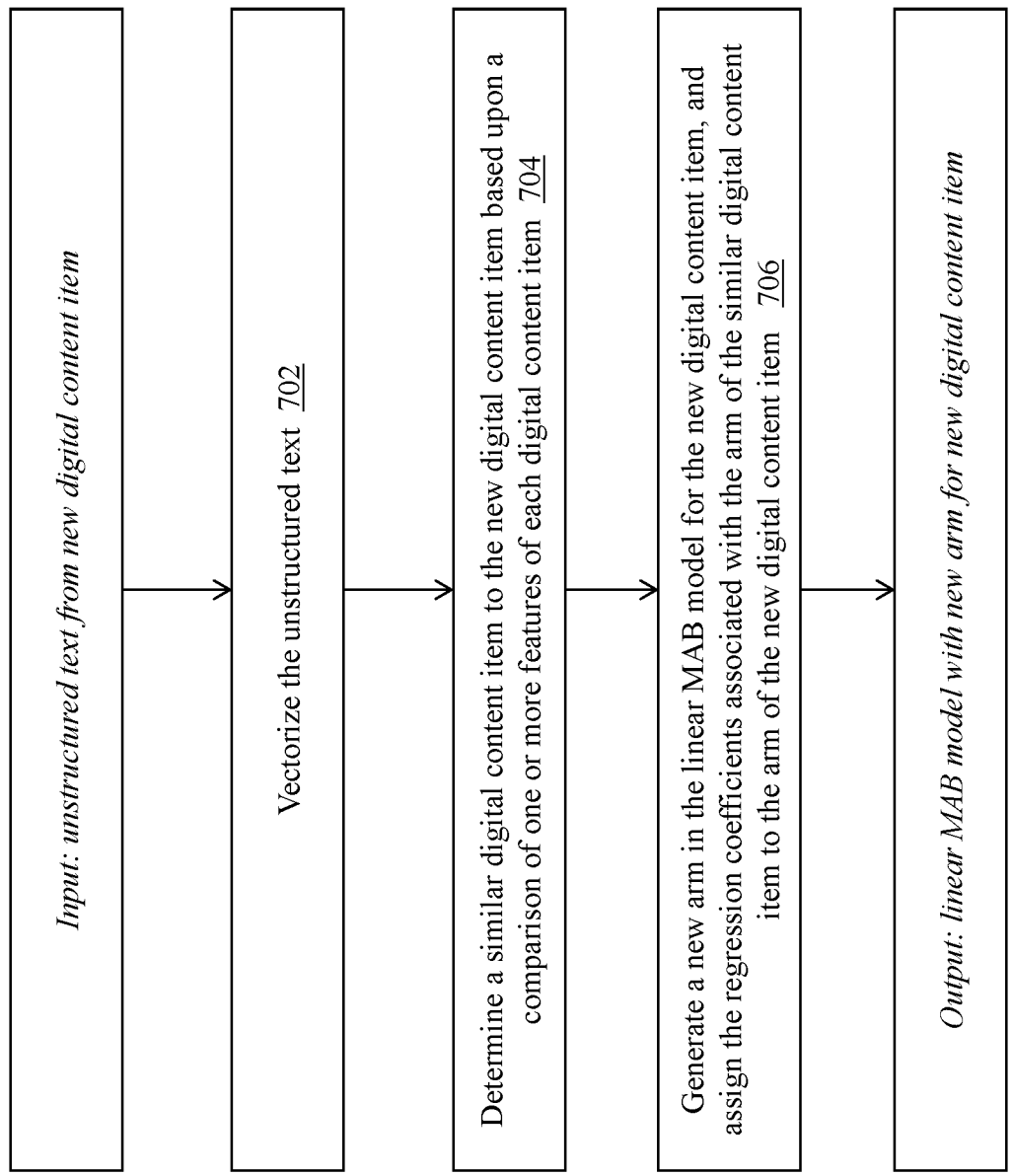
FIG. 7 is a flow diagram of a computerized method of generating MAB classification model regression coefficients for a new digital content item.

FIG. 7 is a flow diagram of a computerized method of generating linear MAB classification model regression coefficients for a new digital content item, using the system 100 of FIG. 1. As shown in FIG. 7, the content factorization module 106b receives as input the unstructured text of the new digital content item and vectorizes (702) the unstructured text of the new digital content item using the method described above with respect to FIG. 4, to generate a multidimensional content item feature set for the new digital content item.

The recommendation modeler 106c then determines (704) a similar digital content item to the new digital content item based upon a comparison of one or more features of each digital content item. For example, the modeler 106c can determine a distance (e.g., using a distance function) between the multidimensional content item feature set of the new digital content item and the multidimensional content item feature set for each of the other digital content items (or a subset of such items) and select the multidimensional content item feature set that is closest in distance to the feature set of the new digital content item. It should be appreciated that other types of comparison mechanisms and/or distance metrics can be used within the scope of invention.

The recommendation modeler 106c then generates (706) a new arm in the linear MAB model 107 for the new digital content item, and assigns the regression coefficients associated with the arm of the similar digital content item to the newly-created arm. This approach enables the linear MAB model 107 to quickly assimilate new digital content items into the model and ensure that corresponding prediction scores for the new items are reasonably accurate. An important factor is that the recommendation modeler 106c can then receive feedback on the new digital content item when the item is presented to a user, and then refine the regression coefficients for the new digital content item to achieve an even more accurate prediction score.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for digital content classification and recommendation to users based upon artificial intelligence reinforcement learning, the system comprising:
   a computer data store comprising (i) a plurality of digital content items, (ii) user profile information for each of a plurality of users, (iii) historical user click information for each the plurality of users; (iv) historical user content consumption information for each of the plurality of users, and (v) historical user content recommendation information for each of the plurality of users;
   a server computing device in communication with the computer data store, the server computing device programmed to:
      convert unstructured text corresponding to each digital content item into a multidimensional content item feature set;
      generate a multidimensional user context vector associated with each user of the plurality of users based upon the user profile information of the user, the historical user click information of the user, the historical user content consumption information of the user;
      train a linear multi-armed bandit (MAB) classification model based upon the multidimensional user context vectors associated with the plurality of users and the historical user content recommendation information for the plurality of users, the MAB classification model comprising a plurality of arms, each arm associated with a digital content item and each arm having a linear upper confidence bound (UCB) coefficient vector that is generated during training;
      receive a new multidimensional user context vector associated with a new user;
      execute the linear MAB classification model using the new multidimensional user context vector as input to generate a plurality of content interaction prediction scores for the new user, each content interaction prediction score generated from one of the arms of the linear MAB classification model;
      select one or more of the plurality of content interaction prediction scores above a predetermined threshold and identify the digital content item associated with each selected content interaction prediction score;
      present one or more of the identified digital content items on a client computing device associated with the new user and receive a response to the presented digital content items from the client computing device; and
      update one or more of the linear UCB coefficient vectors of the linear MAB classification model based upon the response to the presented digital content items.

2. The system of claim 1, wherein the server computing device is further programmed to:
   receive a new digital content item;
   convert unstructured text corresponding to the new digital content item into a new multidimensional content item feature set;
   determine a similar digital content item from the plurality of digital content items based upon a comparison of one or more characteristics of the new digital content item and the plurality of digital content items; and
   update the linear MAB classification model to include a new arm corresponding to the new digital content item, the new arm having the UCB coefficient vector from the arm associated with the similar digital content item.

3. The system of claim 2, wherein the server computing device is further programmed to:
   execute the updated linear MAB classification model using the new multidimensional user context vector as input to generate a plurality of content interaction prediction scores for the new user, each content interaction prediction score generated from one of the arms of the linear MAB classification model;
   select one or more of the plurality of content interaction prediction scores above a predetermined threshold and identify the digital content item associated with each selected content interaction prediction score;
   present one or more of the identified digital content items on a client computing device associated with the new user and receive a response to the presented digital content items from the client computing device; and
   update one or more of the UCB coefficient vectors of the multi-armed bandit (MAB) classification model based upon the response to the presented digital content items.

4. The system of claim 1, wherein converting unstructured text corresponding to each digital content item into a multidimensional content item feature set comprises:
   formatting the unstructured text corresponding to each digital content item;
   generating an initial content item feature set based upon the formatted text using a Term Frequency-Inverse Document Frequency (TF-IDF) algorithm; and
   converting the initial content item feature set into the multidimensional content item feature set using a non-negative matrix factorization (NMF) algorithm.

5. The system of claim 4, wherein the NMF algorithm reduces a number of dimensions of the initial content item feature set.

6. The system of claim 1, wherein the plurality of digital content items comprise one or more of text articles, content cards, or website messages.

7. The system of claim 1, wherein the historical user content consumption information comprises (i) a historical customer profile including demographics of the user, financial activities of the user, and prior interactions of the user; (ii) one or more sequences of web addresses accessed by the user during a browsing session and an identifier associated with a digital content item presented on each web address in the one or more sequences of web addresses; and (iii) historical user content item consumption history information including one or more sequences of text contained in the webpages accessed by the user during a web browsing session.

8. The system of claim 7, wherein generating a multidimensional content consumption vector comprises transforming the historical customer profile, the one or more sequences of web addresses, and the historical user content item consumption history information into features of the multidimensional content consumption vector.

9. The system of claim 1, wherein the response to the presented digital content items comprises a click on one of the presented digital content items.

10. A computerized method of digital content classification and recommendation to users based upon artificial intelligence reinforcement learning, the method comprising:
   storing, by a computer data store, (i) a plurality of digital content items, (ii) user profile information for each of a plurality of users, (iii) historical user click information for each of the plurality of users; (iv) historical user content consumption information for each of the plurality of users, and (v) historical user content recommendation information for each of the plurality of users;

converting, by a server computing device in communication with the computer data store, unstructured text corresponding to each digital content item into a multidimensional content item feature set;

generating, by the server computing device, a multidimensional user context vector associated with each user of the plurality of users based upon the user profile information of the user, the historical user click information of the user, the historical user content consumption information of the user, and the multidimensional content item feature set for one or more digital content items;

training, by the server computing device, a linear multi-armed bandit (MAB) classification model based upon the multidimensional user context vectors associated with the plurality of users and the historical user content recommendation information for the plurality of users, the linear MAB classification model comprising a plurality of arms, each arm associated with a digital content item and each arm having a linear upper confidence bound (UCB) coefficient vector that is generated during training;

receiving, by the server computing device, a new multidimensional user context vector associated with a new user;

executing, by the server computing device, the linear MAB classification model using the new multidimensional user context vector as input to generate a plurality of content interaction prediction scores for the new user, each content interaction prediction score generated from one of the arms of the linear MAB classification model;

selecting, by the server computing device, one or more of the plurality of content interaction prediction scores above a predetermined threshold and identify the digital content item associated with each selected content interaction prediction score;

presenting, by the server computing device, one or more of the identified digital content items on a client computing device associated with the new user and receive a response to the presented digital content items from the client computing device; and updating, by the server computing device, one or more of the linear UCB coefficient vectors of the linear MAB classification model based upon the response to the presented digital content items.

11. The method of claim 10, further comprising:

receiving, by the server computing device, a new digital content item;

converting, by the server computing device, unstructured text corresponding to the new digital content item into a new multidimensional content item feature set;

determining, by the server computing device, a similar digital content item from the plurality of digital content items based upon a comparison of one or more characteristics of the new digital content item and the plurality of digital content items; and updating, by the server computing device, the linear MAB classification model to include a new arm corresponding to the new digital content item, the new arm having the linear UCB coefficient vector from the arm associated with the similar digital content item.

12. The method of claim 11, further comprising:

executing, by the server computing device, the updated linear MAB classification model using the new multidimensional content consumption vector as input to generate a plurality of content interaction prediction scores for the new user, each content interaction prediction score generated from one of the arms of the updated linear MAB classification model;

selecting, by the server computing device, one or more of the plurality of content interaction prediction scores above a predetermined threshold and identify the digital content item associated with each selected content interaction prediction score;

presenting, by the server computing device, one or more of the identified digital content items on a client computing device associated with the new user and receive a response to the presented digital content items from the client computing device; and updating, by the server computing device, one or more of the linear UCB coefficient vectors of the updated linear MAB classification model based upon the response to the presented digital content items.

13. The method of claim 10, wherein converting unstructured text corresponding to each digital content item into a multidimensional content item feature set comprises:

formatting the unstructured text corresponding to each digital content item;

generating an initial content item feature set based upon the formatted text using a Term Frequency-Inverse Document Frequency (TF-IDF) algorithm; and converting the initial content item feature set into the multidimensional content item feature set using a non-negative matrix factorization (NMF) algorithm.

14. The method of claim 13, wherein the NMF algorithm reduces a number of dimensions of the initial content item feature set.

15. The method of claim 10, wherein the plurality of digital content items comprise one or more of text articles, content cards, or website messages.

16. The method of claim 10, wherein the historical user content consumption information comprises one or more sequences of web addresses accessed by the user during a browsing session and an identifier associated with a digital content item presented on each web address in the one or more sequences of web addresses.

17. The method of claim 16, wherein generating a multidimensional content consumption vector comprises transforming the one or more sequences of web addresses into features of the multidimensional content consumption vector.

18. The method of claim 10, wherein the response to the presented digital content items comprises a click on one of the presented digital content items.

* * * * *